(12) United States Patent
Krantz et al.

(10) Patent No.: US 7,814,271 B2
(45) Date of Patent: *Oct. 12, 2010

(54) DISK CONTROLLER CONFIGURED TO PERFORM OUT OF ORDER EXECUTION OF WRITE OPERATIONS

(75) Inventors: Arie L. Krantz, Mission Viejo, CA (US); Kha Nguyen, Anaheim, CA (US); Gregory T. Elkins, Orange, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 12/338,013

(22) Filed: Dec. 18, 2008

(65) Prior Publication Data

US 2009/0150607 A1    Jun. 11, 2009

Related U.S. Application Data

(63) Continuation of application No. 11/509,285, filed on Aug. 24, 2006, now Pat. No. 7,484,037, which is a continuation of application No. 10/920,881, filed on Aug. 18, 2004, now Pat. No. 7,103,715, which is a continuation of application No. 09/643,636, filed on Aug. 22, 2000, now Pat. No. 6,826,650.

(51) Int. Cl.
G06F 12/02     (2006.01)
G06F 13/14     (2006.01)
G11B 21/08     (2006.01)

(52) U.S. Cl. .............. 711/113; 711/112; 711/E12.002; 711/E12.019; 710/52; 369/30.23

(58) Field of Classification Search .................. None
See application file for complete search history.

(56) References Cited

U.S. PATENT DOCUMENTS

| 4,584,617 A | 4/1986 | Libove et al. |
| 4,667,286 A | 5/1987 | Young et al. |
| 5,109,500 A | 4/1992 | Iseki et al. |
| 5,523,903 A | 6/1996 | Hetzler et al. |
| 5,666,494 A * | 9/1997 | Mote, Jr. ..................... 711/167 |
| 5,729,718 A | 3/1998 | Au |

(Continued)

FOREIGN PATENT DOCUMENTS

EP      0 528 273      2/1993

(Continued)

OTHER PUBLICATIONS

PCT International Search Report dated Jan. 21, 2003.

(Continued)

*Primary Examiner*—Denise Tran

(57) ABSTRACT

A controller for a disk drive includes first memory storing first write operations and second write operations received in a first order. A processor arranges the first write operations and the second write operations in a second order based on respective track sectors associated with the first and the second write operations. The second order is different than the first order. A memory controller transfers write operation data corresponding to the first write operations and the second write operations to a disk formatter in the second order in response to a single command from the processor.

18 Claims, 13 Drawing Sheets

U.S. PATENT DOCUMENTS

| | | | |
|---|---|---|---|
| 5,890,210 | A | 3/1999 | Ishii et al. |
| 6,029,226 | A | 2/2000 | Ellis et al. |
| 6,112,265 | A | 8/2000 | Harriman et al. |
| 6,381,659 | B2 | 4/2002 | Proch et al. |
| 6,490,635 | B1 | 12/2002 | Holmes |
| 6,574,676 | B1 | 6/2003 | Megiddo |
| 6,826,650 | B1 | 11/2004 | Krantz et al. |
| 7,103,715 | B2 | 9/2006 | Krantz et al. |
| 7,484,037 | B2 * | 1/2009 | Krantz et al. ............... 711/113 |

FOREIGN PATENT DOCUMENTS

| | | |
|---|---|---|
| JP | 03-183067 | 8/1991 |
| JP | 09-091098 | 4/1997 |

OTHER PUBLICATIONS

Official Communication from the European Patent Office dated Mar. 21, 2007 for Application No. 01 958 970.4-2210; 4 pages.

Final Rejection Organized Translation dated Mar. 22, 2007 for Japanese Application No. 2002-521285; 14 pages.

* cited by examiner

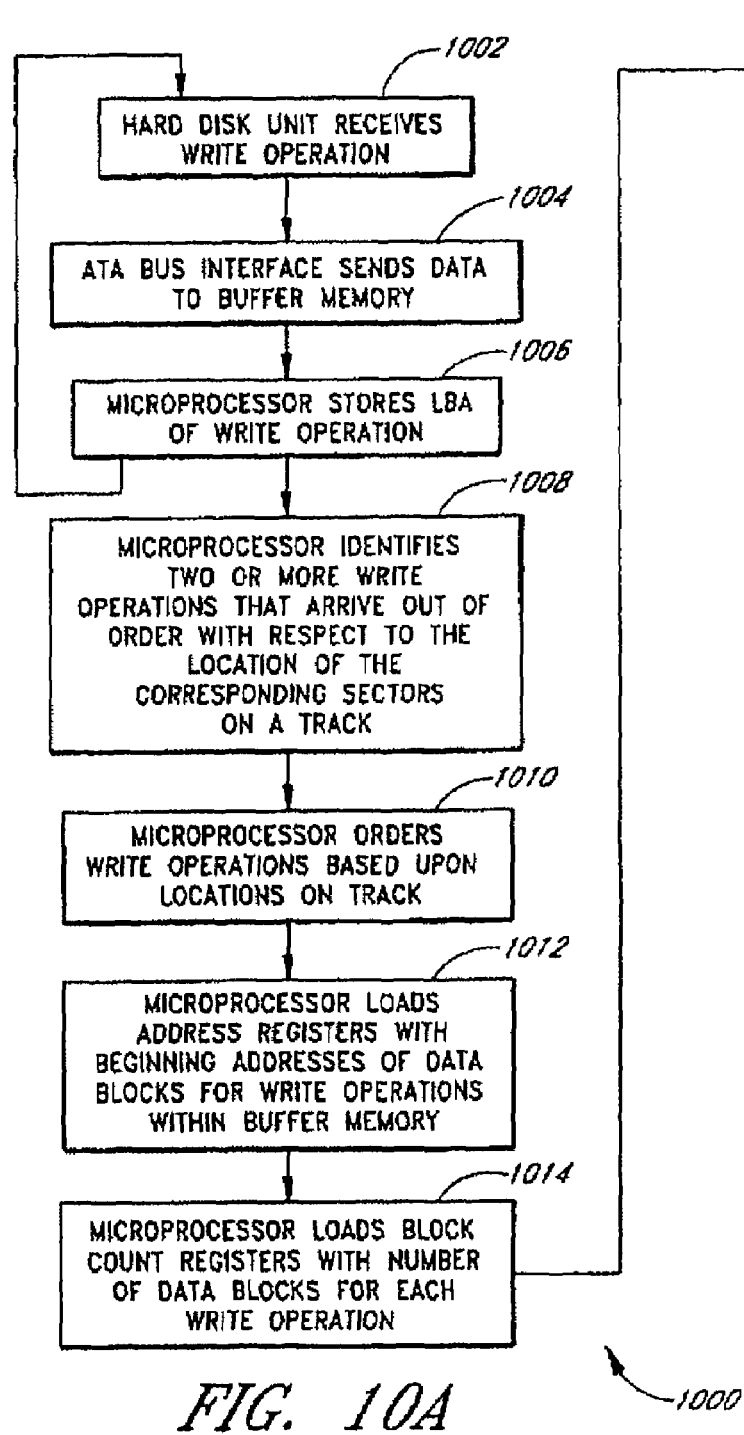
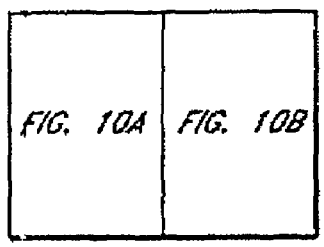
*FIG. 10A*
*FIG. 10*

DISK CONTROLLER CONFIGURED TO PERFORM OUT OF ORDER EXECUTION OF WRITE OPERATIONS

CROSS-REFERENCE TO RELATED APPLICATIONS

This application is a continuation of U.S. patent application Ser. No. 11/509,285, now U.S. Pat. No. 7,484,037 filed Aug. 24, 2006, which is a continuation of U.S. patent application Ser. No. 10/920,881 (now U.S. Pat. No. 7,103,715), filed Aug. 18, 2004, which is a continuation of U.S. patent application Ser. No. 09/643,636 (now U.S. Pat. No. 6,826,650), filed Aug. 22, 2000. The disclosures of the above applications are incorporated herein by reference in their entirety.

FIELD

This invention relates generally to hard disk controllers and, more particularly, the invention relates to a disk controller and associated methods that enable multiple write operations to be executed out of order during a single revolution of a disk.

BACKGROUND

The Background description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

The speed at which a hard disk drive executes read and write operations requested by a host computer is critical to the performance of the computer. Any delay caused by the hard disk drive will likely cause a corresponding delay in the execution of a program by the computer. Some of the developments in hard drive technology have focused on decreasing the response time or increasing the data transfer rate for individual disk operations. Other developments in hard drive technology have focused on decreasing the amount of time that it takes to execute multiple operations. Two of the latter type of developments are described in U.S. Pat. Nos. 4,667,286 and 6,029,226.

U.S. Pat. No. 4,667,286, titled "Method and apparatus for transferring data between a disk and a central processing unit," presents an architecture with toggling data buffers. The architecture allows multiple operations to be performed during a single revolution of the disk. Data is transferred between the central processing unit and a first data buffer while data is transferred between a second data buffer and the disk. The operation of the buffers can be toggled such that data is transferred between the central processing unit and the second data buffer while data is transferred between the first data buffer and the disk.

U.S. Pat. No. 6,029,226, titled "Method and apparatus having automated write data transfer with optional skip by processing two write commands as a single write command," presents a method for combining write commands. The proximity of the first logical block address (LBA) of a second write command is compared to the ending LBA of a first write command. If the second write command is sufficiently close, the disk controller executes the two write commands as a single write command, skipping over the sectors between the two commands during the combined write. Two writes, therefore, can be performed in one revolution of the hard disk.

In certain instances, it would also be advantageous to execute write operations in an order other than the order in which the operations are received by the disk controller. Executing write operations out of order may allow the writes to be executed during a single rather than multiple revolutions of the disk. The total time taken to execute the operations is therefore reduced. The present invention seeks to provide this advantage, among others.

SUMMARY

A memory controller for a disk controller comprises a first memory that receives first and second write operations in a first order and that stores the first and second write operations and corresponding write operation data. A second memory stores a corresponding address for each of the write operations, wherein the corresponding addresses identify a location of the write operation data stored in the first memory. Controller logic determines whether the first write operation and the second write operation write data to a same track of a disk and transfers the write operation data from the first memory to a third memory in a second order when the first write operation and the second write operation write data to the same track, wherein the second order is different from the first order.

A memory controller for a disk controller comprises first memory means for receiving first and second write operations in a first order and for storing the first and second write operations and corresponding write operation data, second memory means for storing a corresponding address for each of the write operations, wherein the corresponding addresses identify a location of the write operation data stored in the first memory means, and control means for determining whether the first write operation and the second write operation write data to a same track of a disk and for transferring the write operation data from the first memory means to third memory means in a second order when the first write operation and the second write operation write data to the same track, wherein the second order is different from the first order.

A method of operating a storage unit comprises receiving first and second write operations in a first order, determining whether the first and second write operations write data to a same track of the storage unit, and writing data corresponding to the first and second write operations to the track in a second order when the first and second write operations write data to the same track, wherein the second order is different from the first order.

A buffer memory controller comprises first memory means for buffering write operation data between a write head and second memory means for storing write operation data corresponding to a first write operation and a second write operation, first memory location means for identifying a location of write operation data that corresponds to the first write operation stored within the second memory means, second memory location means for identifying a location of write operation data that corresponds to the second write operation stored within the second memory means, and controller means for determining whether the first write operation and the second write operation write data to the same track and for transferring the data of the first write operation and the second write operation in an order other than the order in which the second memory means received the first and second write operations when the first write operation and the second write operation write data to the same track.

In other features of the invention, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 10A and 10B illustrate a preferred method performed by the hard disk controller to complete multiple out of order operations using a single set of commands to the buffer memory controller and the disk formatter.

DETAILED DESCRIPTION

Figure 1:
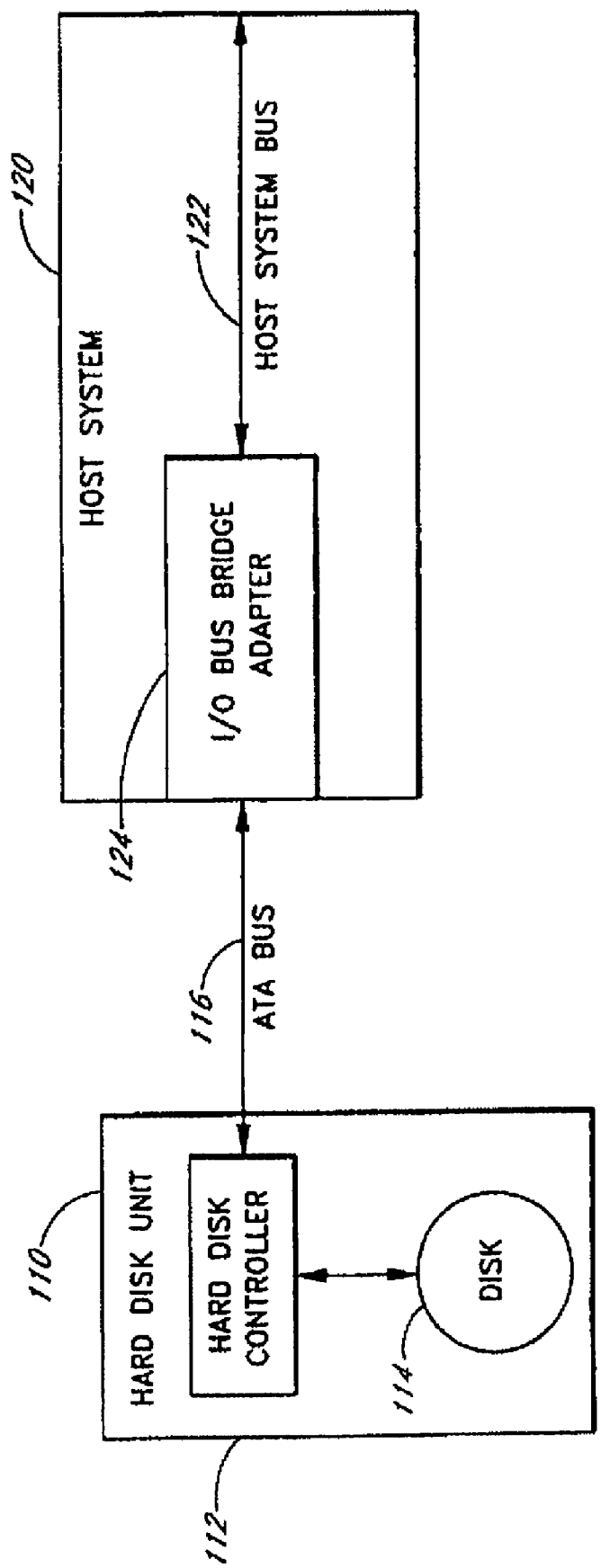
FIG. 1 illustrates a typical configuration of a computer system in which a hard disk unit is utilized as a mass storage device of a host system.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present invention. The present invention, however, may be practiced without the specific details or with certain alternative equivalent components and methods to those described herein. In other instances, well-known methods and components have not been described in detail so as not to unnecessarily obscure aspects of the present invention.

I. HARD DISK CONTROLLER OPERATION

A. Computer System

FIG. 1 illustrates a typical configuration of a computer system in which a hard disk unit 110 is utilized as a mass storage device of a host system 120. The host system 120 is preferably the motherboard of the computer system and typically includes a system bus 122 that connects one or more microprocessors, RAM, and possibly other components. The hard disk unit 110 typically includes a hard disk controller 112 that controls a disk 114. The disk 114 typically includes several platters of rotating magnetic media that are read from and written to by read and write heads (not illustrated). In the illustrated embodiment, the hard disk controller 112 is connected to the host system through an Advanced Technology Attachment (ATA) bus 116. The ATA bus 116 is in turn connected to the host system bus 122 through an I/O bus bridge adapter 124. The adapter 124 serves as a bridge between the different protocols and technologies of the host system bus 122 and the ATA bus 116. Alternative technologies, such as SCSI, USB, or Firewire may also be used in place of the ATA bus 116.

The host system 120 typically sends read and write operations to the hard disk controller 112 via the ATA bus 116. A read operation typically identifies the requested data by the location on the disk of the beginning logical block address (LBA) of the data. The LBA specifies the head, track, and sector number of a block (512K) of data. A sector typically holds one block of data. The request causes the hard disk unit 110 to respond by reading and transmitting the requested data back to the host system 120 via the ATA bus 116. A write operation typically identifies the starting LBA of the location on the disk to be written. Data is transferred from the host system 120 to the hard disk controller 112 and is written to the disk starting at the specified LBA.

B. Hard Disk Controller

Figure 2:
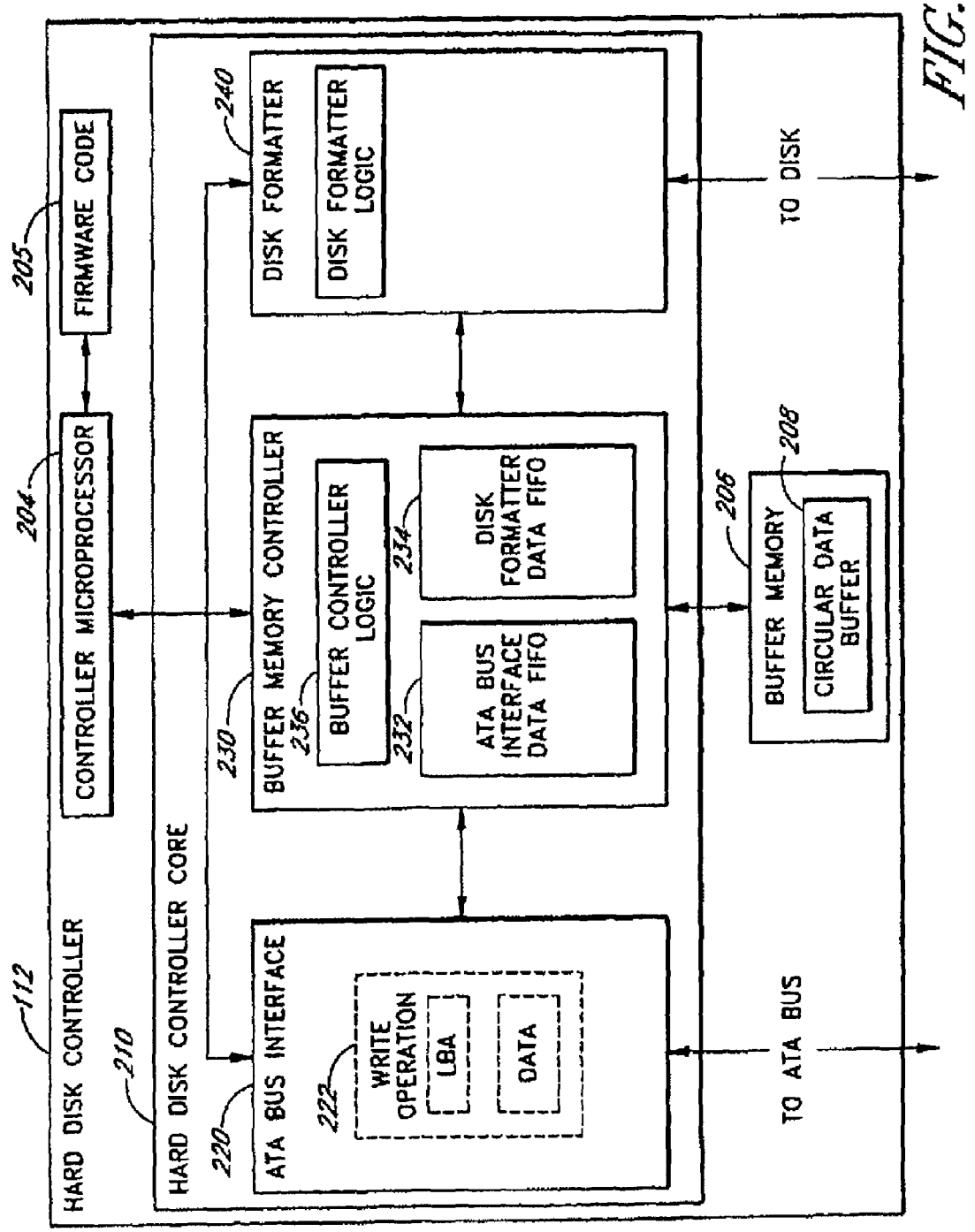
FIG. 2 illustrates a typical configuration of a hard disk controller.

FIG. 2 illustrates a typical configuration of a hard disk controller 112. The hard disk controller 112 typically includes a microprocessor 204, a set of firmware code 205, a buffer memory 206, and a hard disk controller core 210. The controller core 210 handles the flow of data between the ATA bus 116 and the disk 114. The controller's tasks typically include transferring data between the disk 114 and the buffer memory 206, transferring data between the buffer memory 206 and the ATA bus 116, and performing error correction and CRC calculations. The operation of the controller core 210 is in turn controlled by the controller microprocessor 204, which typically executes the set of firmware code 205. The firmware code 205 may be stored in nonvolatile memory. The microprocessor may also have an additional interface (not illustrated) to the disk 114 to handle tasks such as moving the read/write heads of the disk 114 to the proper track. The buffer memory 206 is used to buffer data between the disk 114 and the ATA bus 116 to compensate for delays, latency, and timing differences between the two devices. In some configurations, the buffer memory 206 also serves as the memory for the controller microprocessor 204. The size of the buffer memory 206 may range from 256 kilobytes to 8 megabytes, depending upon the application.

The controller core 210 typically includes an ATA bus interface 220, a buffer memory controller 230, and a disk formatter 240. The ATA bus interface 220 implements the ATA bus protocol to receive write operations and read operations and to send read data to the host system 120. A write operation 222 is shown in dashed lines to indicate that it passes through the bus interface 220. The LBA of the write operation is typically read by the microprocessor 204 and stored. The bus interface 220 passes the data to the buffer memory 206 through the buffer memory controller 240.

The buffer memory controller 230 controls interleaved access to the buffer memory 206 by the ATA bus interface 220, the disk formatter 240, and the microprocessor 204. The control of the buffer memory 206 by the buffer memory controller 230 typically involves arbitrating access by the various units as well as buffering data, yet again, between the buffer memory 206 and the units that access it. The buffer memory controller 230 typically includes an ATA bus interface data FIFO (first in, first out buffer) 232 that buffers data between the ATA bus interface 220 and the buffer memory 206, a disk formatter data FIFO 234 that buffers data between the buffer memory 206 and the disk formatter 240, and buffer controller logic 236 that controls the functionality of the buffer controller 230. The buffer controller 230 typically stores write operation data in a circular data buffer 208 that the buffer controller 230 implements within the buffer memory 206, preferably using pointers. The ATA bus interface data FIFO 232 and the disk formatter data FIFO 234 are relatively small FIFO buffers, preferably about 64 bytes each. The circular data buffer 208, on the other hand, is preferably much larger, possibly occupying the whole buffer memory 206, which may be 256 kilobytes to 8 megabytes in some embodiments.

The disk formatter 240 controls the actual writing of data to the disk 114. The disk formatter 240 typically receives data from the buffer memory 206 through the buffer memory controller, formats the data for writing to the disk, possibly adding error correction codes, and sends the data to the write head of the disk. The disk formatter 240 also monitors the sector of a track over which the disk's read/write head is positioned to determine the proper timing for sending the data to the write head. The functionality of the disk formatter is controlled by disk formatter logic 242.

Figure 3:
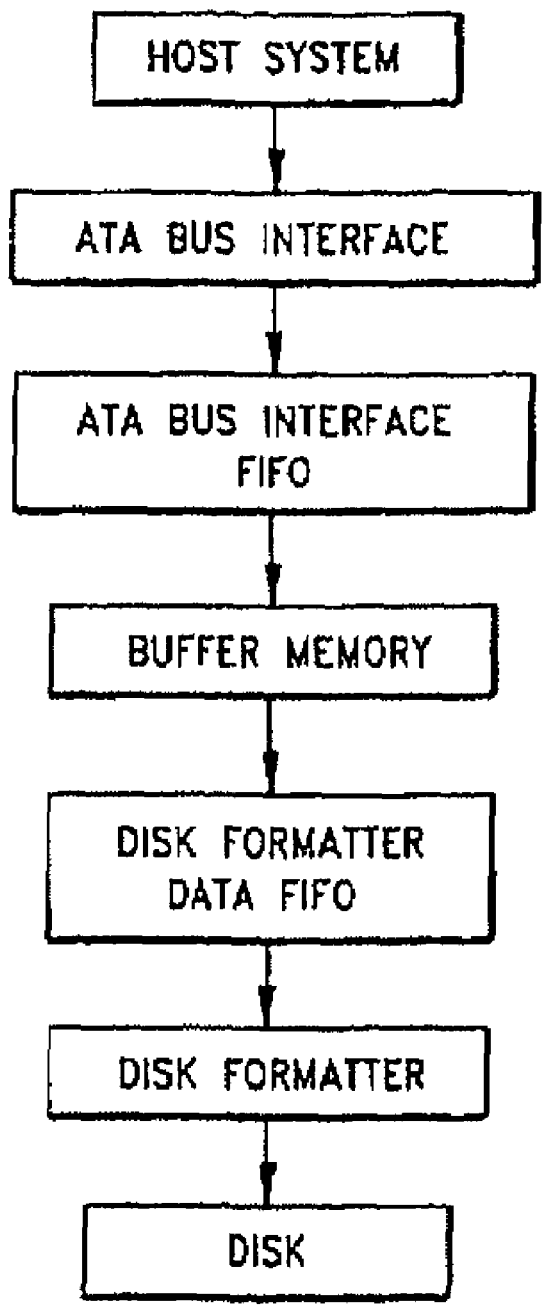
FIG. 3 illustrates the flow of data from the host system to the disk during a typical disk write operation.

FIG. 3 illustrates the flow of data from the host system 120 to the disk 114 during a typical disk write operation. The data is first transferred from the host system 120 via the ATA bus 116 to the ATA bus interface 220 of the hard disk controller 112. The ATA bus interface 220, in turn, transfers the data through the ATA bus interface FIFO 232 of the buffer memory controller 230 to the circular data buffer 208 in the buffer memory 206. The data remains in the circular data buffer 208 until it is to be written to the disk 114. If the disk heads have been correctly positioned and the microprocessor 204 has determined that the data is ready to be written to disk 114, the microprocessor 204 issues a command to the buffer controller 230 to begin transferring the data into the disk formatter data FIFO 234. The microprocessor 204 also issues a command to the disk formatter 240 to begin reading the data from the disk formatter data FIFO 234, formatting the data, and sending the data to the write head of the disk 114. A disk formatter command typically only instructs the disk formatter 240 to write data to one track on the disk. In the case of a large write operation, for example, on the order of several megabytes, earlier data already placed in the circular data buffer 208 is read by the disk formatter 240 while later data for the same operation is being written to the circular data buffer 208 by the ATA bus interface 220. If the write operation involves writing to multiple tracks, after the disk formatter 240 writes data to each track, the microprocessor 204 moves the write head to the next track and issues an additional command to the disk formatter 240 to write data to the next track.

Figure 4:
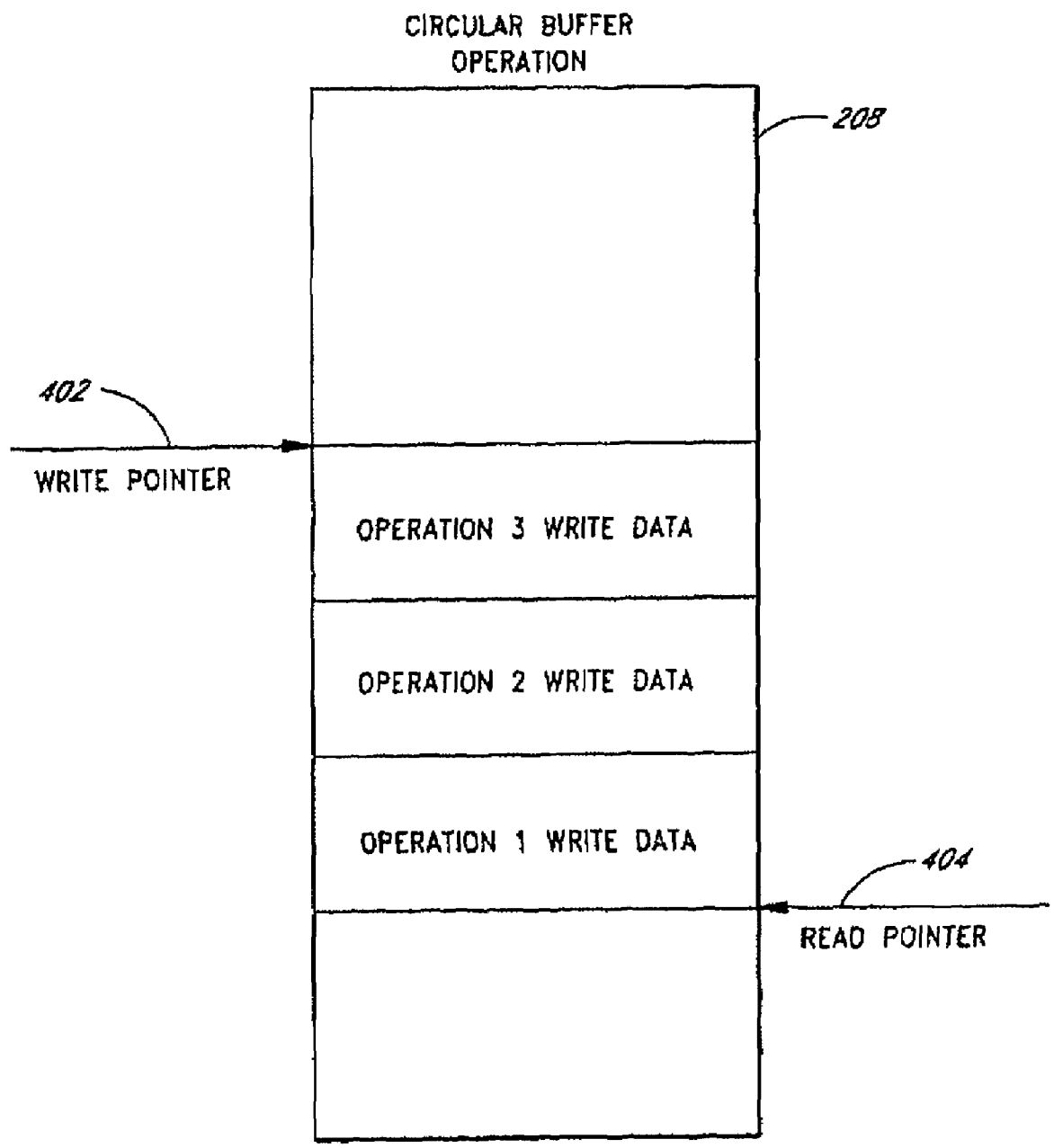
FIG. 4 illustrates the operation of a circular data buffer during write operations.

FIG. 4 illustrates the operation of the circular data buffer 208 during write operations. In the illustrated example, the data of three write operations have been written to the buffer memory 206 by the ATA bus interface 220. The buffer memory controller 230 updates a write pointer 402 to indicate the address within the buffer memory 206 at which the controller writes incoming data from the ATA bus interface 220. As data is written, the pointer 402 is updated. If the write pointer 402 reaches the end of the circular buffer 208, the pointer 402 is wrapped around to the other end to effect the circular buffer functionality. A read pointer 404 indicates the address at which data is read from the circular buffer 208 to be transferred to the disk formatter 240. In the illustrated example, the data of the three write operations in the buffer 208 has not yet been transferred to the disk formatter 240. As data is read, the default operation of the buffer memory controller logic 236 advances the read pointer 404 within the circular buffer 208. The read pointer is eventually wrapped around like the write pointer. In one embodiment, as long as the buffer controller is not reset, the read pointer 404 will continually advance through the data of write operation after write operation as long as the disk formatter 234 continues to read the data from the disk formatter data FIFO 234. The write pointer 404 typically will not, however, advance past the read pointer 402.

Figure 5:
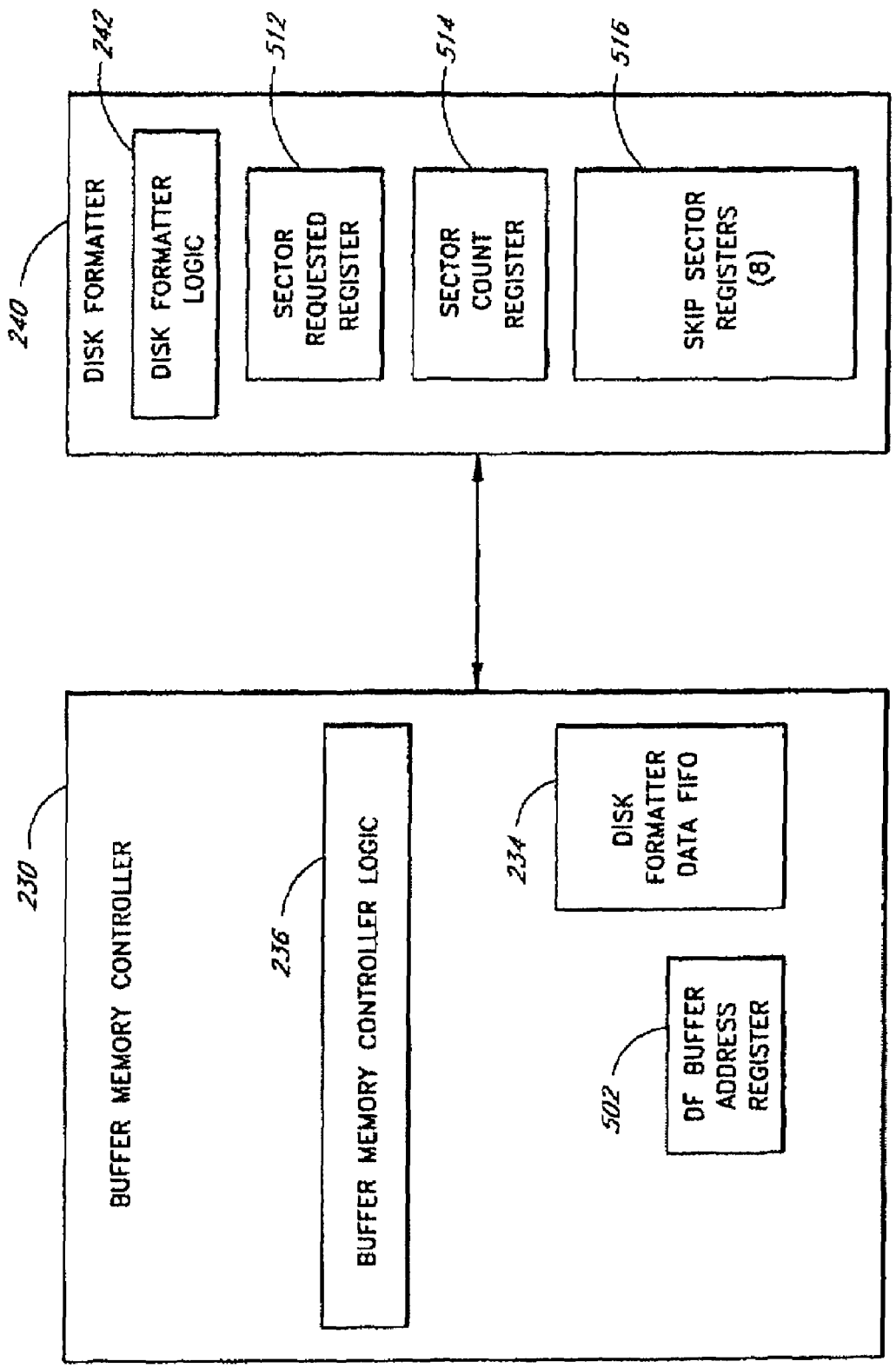
FIG. 5 illustrates a buffer memory controller and a disk formatter in detail.

FIG. 5 illustrates the buffer memory controller 230 and the disk formatter 240 in greater detail. The buffer memory controller 230 includes a disk formatter (DF) buffer address register 502 in which the read pointer 404 is maintained during write operations. Typically, the buffer address register 502 is initially loaded by the microprocessor 204. The buffer memory controller logic 236, however, automatically advances the buffer address register 502 as data is transferred to the disk formatter data FIFO 234.

The disk formatter 240 typically includes a sector requested register 512, a sector count register 514, and a set of skip sector registers 516. The microprocessor 204 initiates a disk operation by loading the sector requested register 512, the sector count register 514, and the skip sector registers 516 with the appropriate values and by issuing a command to the disk formatter 240. The sector requested register 512 is loaded with the sector number of the first sector on the track to be written in conjunction with the command. The sector count register 514 is loaded with the number of sectors to be written during the operation. There are typically 8 skip sector registers 516. Each skip sector register 516 typically contains a 10-bit sector 1D field and a 4-bit length field to identify unique sectors that are to be skipped during the execution of a command. Sectors are typically skipped because they are defective. The 4-bit length field provides a range value starting from the sector pointed to by the ID field. The range value is set to zero when the skip register is not valid. Access to the skip sector registers 516 is through a single FIFO-like interface. The skip sector registers 516 must be loaded in ascending order. During command execution, the sector requested register 512 is compared with the skip sector registers to determine if the sector is to be skipped. Skipped sectors are not counted as part of the sector count.

C. Typical Method for Handling Write Operations

Figure 6:
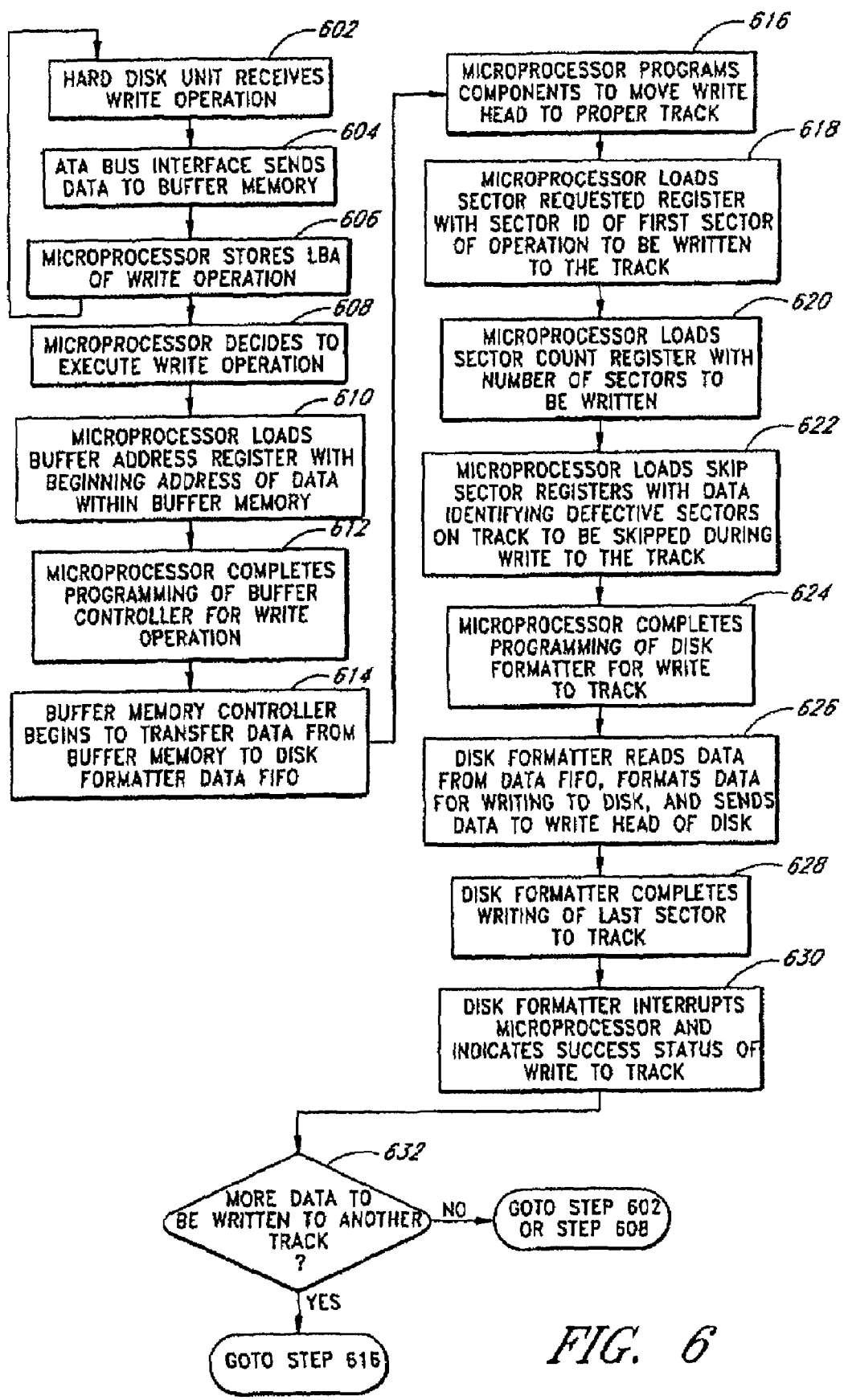
FIG. 6 illustrates a method by which the hard disk controller typically handles write operations.

FIG. 6 illustrates a method 600 by which the hard disk controller 112 handles write operations. At a step 602, the ATA bus interface 220 of the hard disk controller 112 receives a write operation 222 from the host system 120. The write operation 222 typically includes the data to be written to disk and an LBA identifying the starting location on the disk to which the data is to be written.

At a step 604, the ATA bus interface 220 sends the data to the circular data buffer 208 of the buffer memory 206. In order to send the data to the buffer memory 206, the ATA bus interface 220 writes the data to the ATA bus interface FIFO 232 of the buffer memory controller 230. The buffer memory controller 230, in turn, maintains the write pointer 402 of the circular data buffer 208 and writes the data to the buffer memory 206. The buffer memory controller 230 interleaves the writing of the data from the ATA bus interface FIFO 232 with other reads and writes from the disk formatter data FIFO 234, for example, and other units that access the buffer memory, such as the controller microprocessor 204.

At a step 606, the microprocessor 204 reads the LBA from the ATA bus interface 220 and stores the LBA of the write operation 222. The controller microprocessor 204 typically uses a portion of the buffer memory 206 as its working memory. The microprocessor 204 may, in this case, store the LBA in the buffer memory 206, accessing the buffer memory through the buffer memory controller 230. Before control proceeds to the remaining steps of the method 600, additional write operations may be received by the ATA bus interface 220 and handled by the microprocessor 204 as indicated by the arrow leading from the step 606 to the step 602.

At a step 608, the microprocessor 204 decides to execute a received write operation. The microprocessor 204 is preferably programmed by the firmware code 205 in accordance with known techniques in order to determine when to execute the operation.

At a step 610, the microprocessor 204 loads the disk formatter buffer address register 502 with the beginning address of the write operation data within the buffer memory 206. At a step 612, the microprocessor 204 completes programming of the buffer controller 204 for the write operation. This step may involve clearing the disk formatter data FIFO 234 of any stale data and/or loading a command into a command register of the buffer memory controller 230.

At a step 614, the buffer memory controller 230 begins to transfer data from the buffer memory 206 to the disk formatter data FIFO 234. As the disk formatter 240 reads the data from the FIFO 234, the buffer memory controller 230 writes data to the FIFO 234 to keep the FIFO 234 from underflowing.

At a step 616, the microprocessor 204 programs any additional components necessary to move the write head of the disk 114 to the proper track. The circuits that control the movement of the write head are preferably external to the controller core 210 but may be included in the core 210. The step 616 may alternatively be performed between the steps 610 and 608.

At a step 618, the microprocessor 204 loads the sector requested register 512 of the disk formatter 240 with the sector 11) of the first sector of the write operation to be written to the track. At a step 620, the microprocessor 204 loads the sector count register 514 with the number of sectors to be written to the track. In the case a write operation spans multiple tracks, the number of sectors that are written to the track may be less than the number of blocks in the entire operation. In this case, the disk formatter 240 is later programmed to write data to the subsequent tracks after the write to the present track has been completed.

At a step 622, the microprocessor 204 loads the skip sector registers 516 with data identifying defective sectors on the track to be skipped during the write to the track. At a step 624, the microprocessor 204 completes programming of the disk formatter 240 for the write to the track. This step typically includes loading a command into a command register of the disk formatter 240.

At a step 626, the disk formatter 240 begins execution of the command loaded into its command register by the microprocessor 204. The disk formatter 240 reads data from the disk formatter data FIFO 234, formats the data for writing to the disk 114, and sends the data to the write head of the disk 114. The formatting of the data for writing to the disk 114 may involve adding a cyclic redundancy check (CRC) code to the data. The disk formatter 240 typically also determines the proper timing for sending the data to the write head of the disk 114 so that the data is written to the proper location on the track.

At a step 628, the disk formatter 240 completes the writing of the last sector to the current track. At a step 630, the disk formatter 240 sends an interrupt to the controller microprocessor 204 and indicates the success status of the write to the track. Typically the write will have been successful. If the write was unsuccessful, the microprocessor with then handle the problem.

At a step 632, the microprocessor determines whether there is more data to be written to another track in conjunction with the present write operation. If additional data remains to be written to another track, control passes back to the step 616. From the step 616, the microprocessor moves the write head to the next track and programs the disk formatter 240 to write more data to the next track.

At the step 632, if the current write operation has completed because no more data remains to be written to another track, the hard disk controller 112 is ready to handle the receipt or execution of another write operation. Accordingly, control passes to either the step 602 or the step 608, possibly depending upon whether another write operation has already been received.

D. Combining Write Operations to Improve Performance

In one embodiment, the microprocessor 204 may be programmed to complete two or more write operations with only a single command to the buffer memory controller 230. The buffer memory controller need not be reprogrammed as in the steps 610-614 as long as the data from the second write operation is written contiguously after the data of the first write operation within the circular data buffer 208 before the first operation completes. The buffer memory controller 230 is preferably configured to continue supplying data from circular data buffer 208 to the disk formatter data FIFO 242 as long as the disk formatter 240 keeps reading the data. Accordingly, the buffer memory controller 230 will continue to supply data to the disk formatter data FIFO 234 from the circular data buffer 208 as the last of the data of the first write operation is read by the disk formatter 240 and written to disk. The data that the buffer memory controller 230 automatically supplies to refill the FIFO 234 will be the data of the second write operation. In this instance, therefore, the buffer memory controller 230 need not be reprogrammed, and the steps 610-614 of the process 600 can be skipped.

In one embodiment, the microprocessor 204 may also be programmed to partially or completely write data from two write operations using a single command to the disk formatter 240. A single command to the disk formatter can be used when the ending LBA of an earlier operation has the same track but a lower sector number than the beginning LBA of the subsequent operation. In this case the microprocessor can treat the two operations as a single operation by instructing the disk formatter 240 to skip the sectors between the two operations. This can be accomplished by loading one or more of the skip sector registers 516 with the registers to be skipped between the write operations.

The aforementioned techniques allow the programming of the buffer controller 230 and/or the disk formatter 240 for two or more write operations to be combined. One advantage to combining the programming of the disk formatter 240 for two or more write operations is that the write operations will be completed in a single revolution.

The microprocessor 204 typically has a much longer response time and is much slower than the disk formatter 240 to react. There is typically not enough time after the disk formatter 240 interrupts the microprocessor 204 upon completion of a write operation to allow the microprocessor 204 to reprogram the disk formatter 240 for a second write operation without losing a revolution of the disk 114. Accordingly, in order to complete more than one write operation during a single revolution of the disk 114, the two or more write operations must be completed through a single command to the disk formatter 240. In order to combine the programming of the disk formatter 240 for the two or more operations the programming of the buffer controller 230 for these operations must also be combined. This is the case since the microprocessor 204 is also typically not fast enough to reprogram the buffer controller 230 between write operations.

As already mentioned, the controller microprocessor 204 is generally not fast enough to reprogram the buffer memory controller 230 or the disk formatter 240 between the write operations. In addition, some disk formatters may be configured to begin execution of each command by searching for the first sector on a track, such as, for example, to begin a timing sequence for writing the data. In such cases, the disk formatter 240 will nevertheless be able to execute only one command per revolution, regardless of the speed of the microprocessor 204. Accordingly, if several write operations that write data to the same track on a disk are to be executed in a single revolution, the write operations must typically be completed through a single command to each of the buffer controller 230 and the disk formatter 240.

Executing more than one write operation in a single revolution of the disk 114 substantially speeds up the execution of the writes. For example, if two writes are executed in a single revolution, execution time can be decreased to as little as ½ of the time of separately executing the writes. If four writes are executed in a single revolution, execution time will be at most 113 and as little as 114 of the time of executing the writes separately E. Limitations of the Aforementioned Techniques Although the aforementioned techniques can be used to decrease the time to perform several write operations in certain instances, in other instances, these techniques cannot be used. For example, if the order in which the write operations arrive does not correspond to the order of the respective write operations on the disk, these techniques cannot be used.

Figure 7:
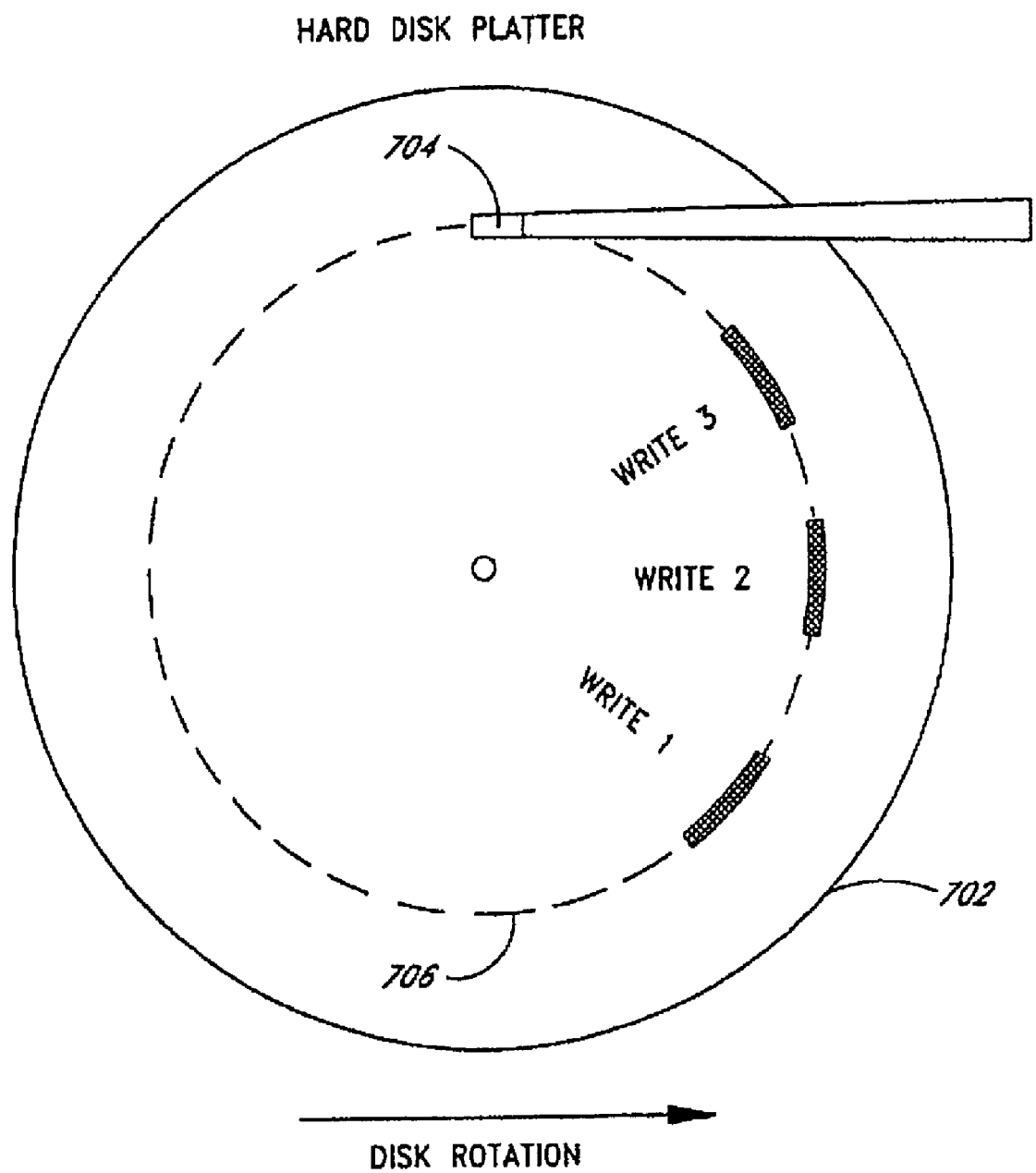
FIG. 7 illustrates a schematic of a hard disk platter in conjunction with a write head.

FIG. 7 illustrates a schematic of a hard disk platter 702 in conjunction with a write head 704. The disk 702 is indicated as rotating in the counter-clockwise direction. Also illustrated are the sectors of three separate write operations (write 1, write 2 and write 3) to one of the tracks 704 of the platter 700. The sectors of the operations pass under the write head 704 such that the operation 3 passes the head 704 first, the operation 2 passes second, and the operation 1 passes third. Suppose the write operation 1 arrives at the hard disk controller 112 first, the operation 2 arrives second, and the operation 3 arrives third. The write operations will be stored in the buffer memory in this same sequence as illustrated in FIG. 4. Accordingly, the order in which the operations are stored in the circular data buffer 208 does not correspond to the order of the operations' sectors on the track 704. As a result, a single command cannot be used to program the buffer memory controller 230 to supply the data of the respective operations in the proper order to be written to disk.

The buffer memory controller 230 described above is only configured to be able to supply data, through a single command, in the same order in which the data is located in the circular data buffer 208. Consequently, if any two operations are out of order within any sequence of write operations to the same track, the data of the sequence of operations cannot be provided using a single buffer controller command.

As will be shown in the preferred embodiment below, the buffer controller 240 can be augmented with additional components that allow it to supply data from different sections of the circular data buffer 208 in non-sequential order using a single command from the microprocessor 204.

II. PREFERRED EMBODIMENT

A. Augmented Buffer Memory Controller and Disk Formatter

Figure 8:
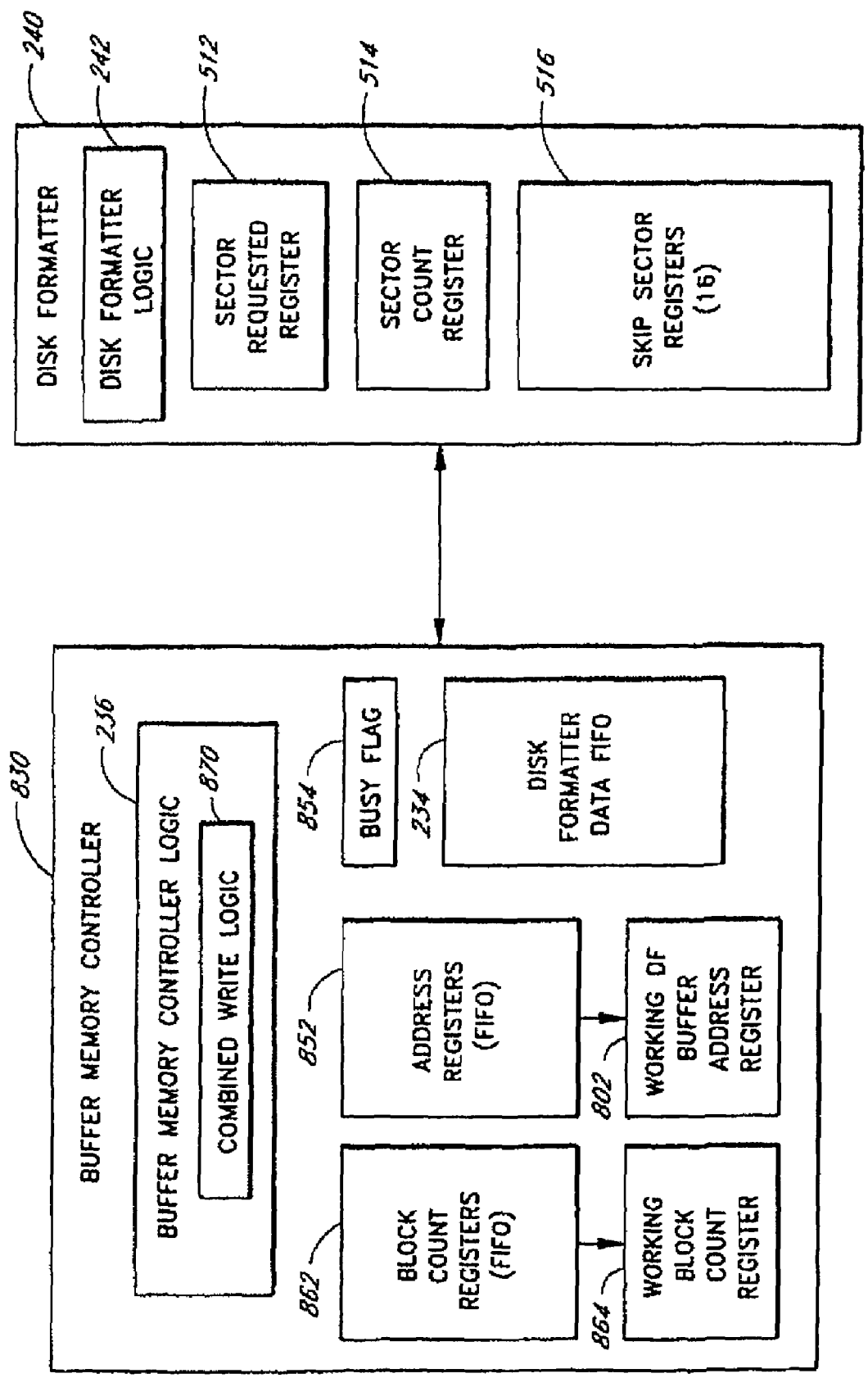
FIG. 8 illustrates a preferred embodiment of a buffer memory controller augmented to perform non-sequential reads of a buffer memory through a single command from a microprocessor.

FIG. 8 illustrates a preferred embodiment of a buffer memory controller 830 augmented to perform non-sequential reads from the buffer memory 206 through a single command from the microprocessor 204. The buffer memory controller 830 preferably includes all of the components illustrated in FIG. 5 of the buffer memory controller 230. The buffer memory controller 830 also preferably includes a set of address registers 852, a working disk formatter buffer address register 802, a set of block count registers 862, a working block count register 864, a busy flag 854, and combined write logic 870.

There are preferably 8 or more registers in the set of address registers 852. Although 4, 3, or 2 address registers could be used, this would limit the number of write operations that could be written through a single set of commands to the buffer memory controller 830 and the disk formatter 240. The microprocessor 204 loads each of the address registers 852 with the starting address of the data in the buffer memory 206 for one of the write operations to be written to the track. The address registers 852 are loaded in the order in which the write operations are to be performed. The address registers 852 are preferably configured to be written to by the microprocessor 204 through a FIFO-like interface, similar to the skip sector registers 516. Each of the addresses in the set of address registers 852 is eventually transferred into the working disk formatter buffer address register 802 during execution of the write operations. The working address register 802 functions substantially in the same way as the buffer address register 502.

The number of block count registers 862 matches the number of address registers 852. The microprocessor 204 loads each of the block count registers 862 with the number of blocks of data stored in the buffer memory 206 to be written to the track for the corresponding write operation. The block count registers 862 are loaded in the order in which the write operations are to be performed. Like the address registers 852, the block count registers 862 are preferably configured to be written to by the microprocessor 204 through a FIFO-like interface, similar to the skip sector registers 516. Each of the block counts in the block count registers 862 is eventually transferred into the working block count register 864 during the execution of the write operations. The working block count register 864 is used to count down the number of blocks remaining to be transferred as they are transferred from the buffer memory 206 to the disk formatter data FIFO 234 for each operation.

The busy flag 854 is preferably a register or a bit in a register that can be read by the microprocessor 204 to determine whether the address registers 852 and the block count registers 862 are full. If the register sets 852 and 862 are full, the bit is set. If the register sets 852 and 862 are not full, the bit is cleared.

The combined write logic 870 is preferably added to the buffer memory controller logic 236 to control the functionality of the block count registers 862, the address registers 852, the working block count register 864, the busy flag 854. The logic 870 controls these elements to transfer the data of multiple write operations to the disk formatter data FIFO 234 from a single command supplied by the microprocessor 204 regardless of the order of the operations' data in the buffer memory 206.

The disk formatter 240 of the preferred embodiment is substantially unmodified. The number of skip sector registers 516, however, is preferably increased. In the preferred embodiment, 16 skip sector registers 516 are included instead of 8 to handle the extra sector skips between the two or more write operations on the same track.

B. Buffer Memory Controller Methods

Figure 9A:
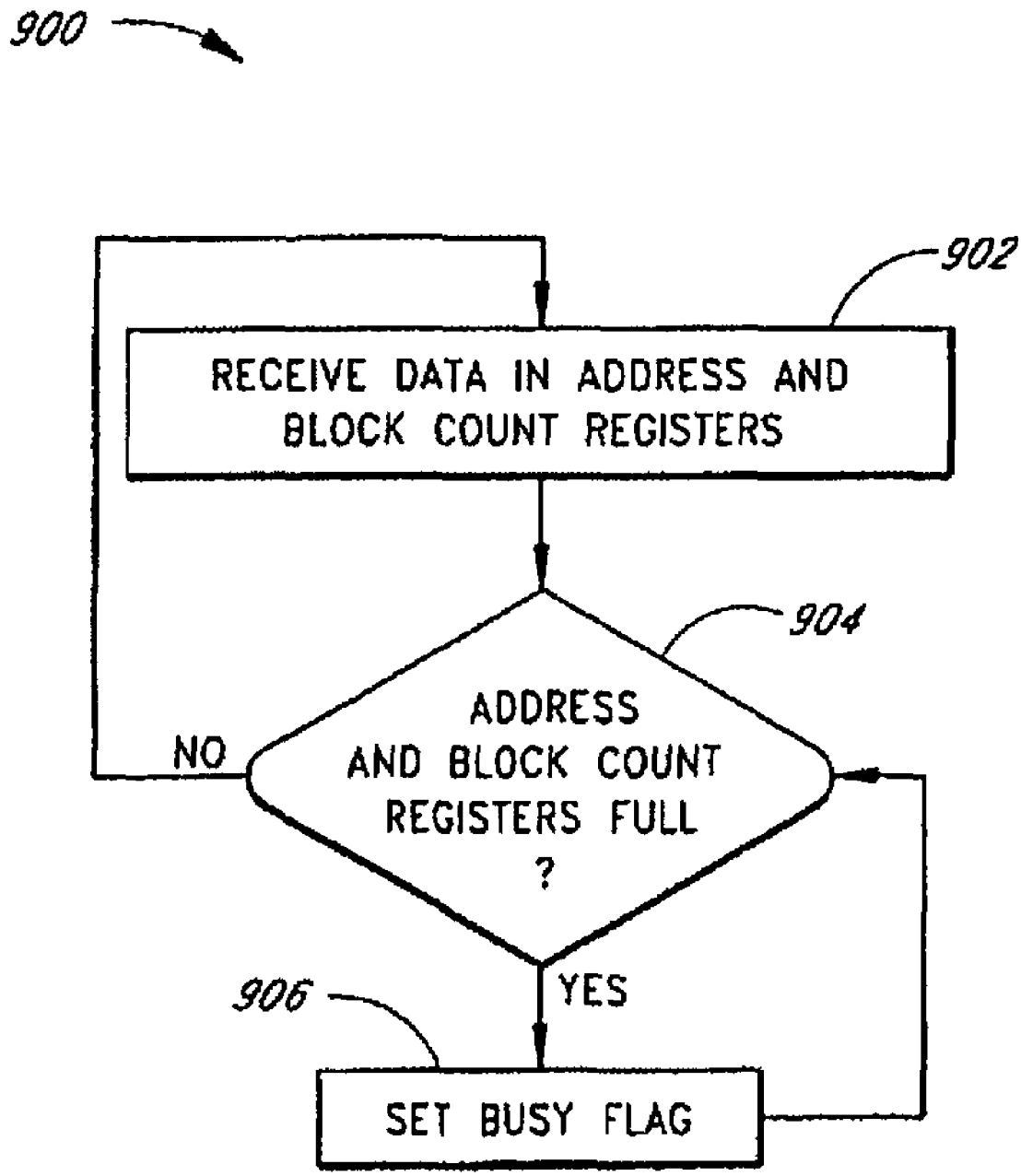
FIGS. 9A and 9B illustrate preferred methods performed by the buffer memory controller to achieve combined write functionality for write operations received out of order.
Figure 9B:
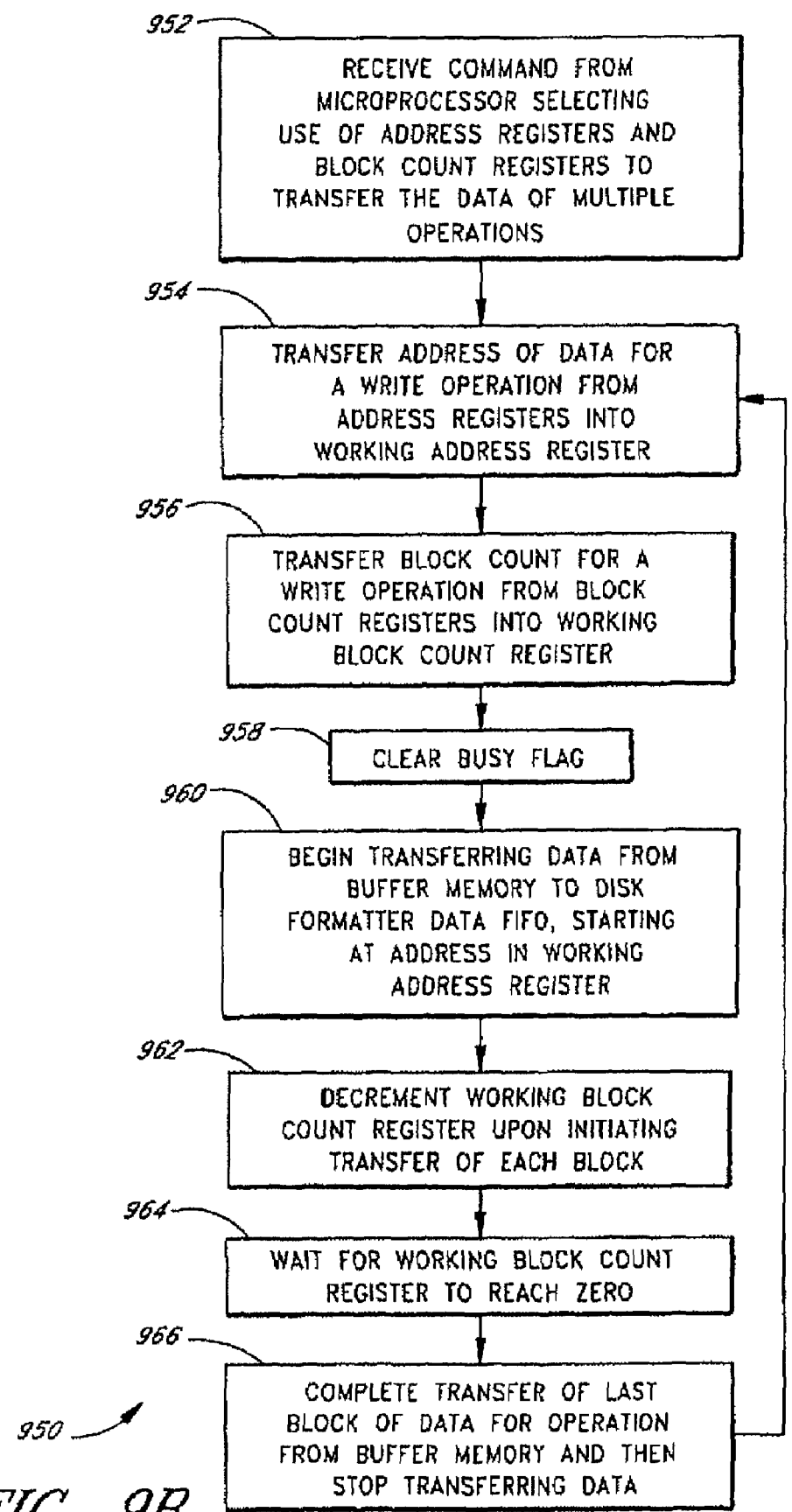

FIGS. 9A and 9B illustrate preferred methods 900 and 950 performed by the controller 830 under the control of the combined write logic 870 and the buffer memory controller logic 236 to achieve the combined write functionality for write operations received out of order. The methods 900 and 950 may be performed simultaneously, preferably in an interleaved fashion. The method 900 sets the busy flag 854, while the method 950 manipulates the working buffer address 802 and working block count 864 registers.

At a step 902 of the method 900, the buffer memory controller 830 receives data in the address registers 852 and the block count registers 862. At a step 904, the controller 830 determines whether the address and block count registers 852 and 862 are all full. If the registers 852 and 862 are full, the controller 830 sets the busy flag 854. If the registers 852 and 862 are not full, the controller 830 passes control back to the step 902.

At a step 952 of the method 950, the buffer memory controller 830 receives a command from the microprocessor 204 that selects the use of the address registers 852 and the block count registers 862 to transfer the data of multiple operations. The use of these registers 852 and 862 is preferably made an option to the microprocessor 204, the option may only be selected when the operations to be combined have arrived out of order.

At a step 954, the buffer memory controller 830 transfers an address of data for a write operation from the address registers 852 into the working address register 802. The addresses are transferred from the address registers 852 in the order in which the address registers 852 were loaded by the microprocessor 204. In other words, the address registers 852 preferably have a FIFO functionality. At a step 956, the controller 830 transfers a block count for a write operation from the block count registers 862 into the working block count register 864. The block count registers 862 also have a FIFO functionality. At a step 858, the controller clears the busy flag since at least one location in each of the sets of registers 852 and 862 has just been emptied.

At a step 960, the controller 830 begins transferring data from the buffer memory 206 to the disk formatter data FIFO 234, starting at the address in the working address register 802. The controller preferably uses the working address register 802 as a read pointer and increments the register 802 as it reads data from the buffer memory 206.

At a step 962, the controller 830 decrements the working block count register 864 upon initiating the transfer of each block (512K) of data from the buffer memory 206 to the disk formatter data FIFO 234.

At a step 964, the controller 830 waits for the working block count register 864 to reach zero. This indicates that the last block of the operation has begun to be transferred from the buffer memory 206 to the disk formatter data FIFO 234. At a step 966, the controller 830 transfers the last block of data for the operation and then stops transferring data. At this point control passes back to the step 954, and the data of the next write operation is transferred.

The process 950 continues until all of the entries in the address registers 852 and the block count registers 862 have been processed. Once all of the entries have been processed, the controller 830 is ready to receive another command from the microprocessor 204.

C. Hard Disk Controller Method

Figure 10B:
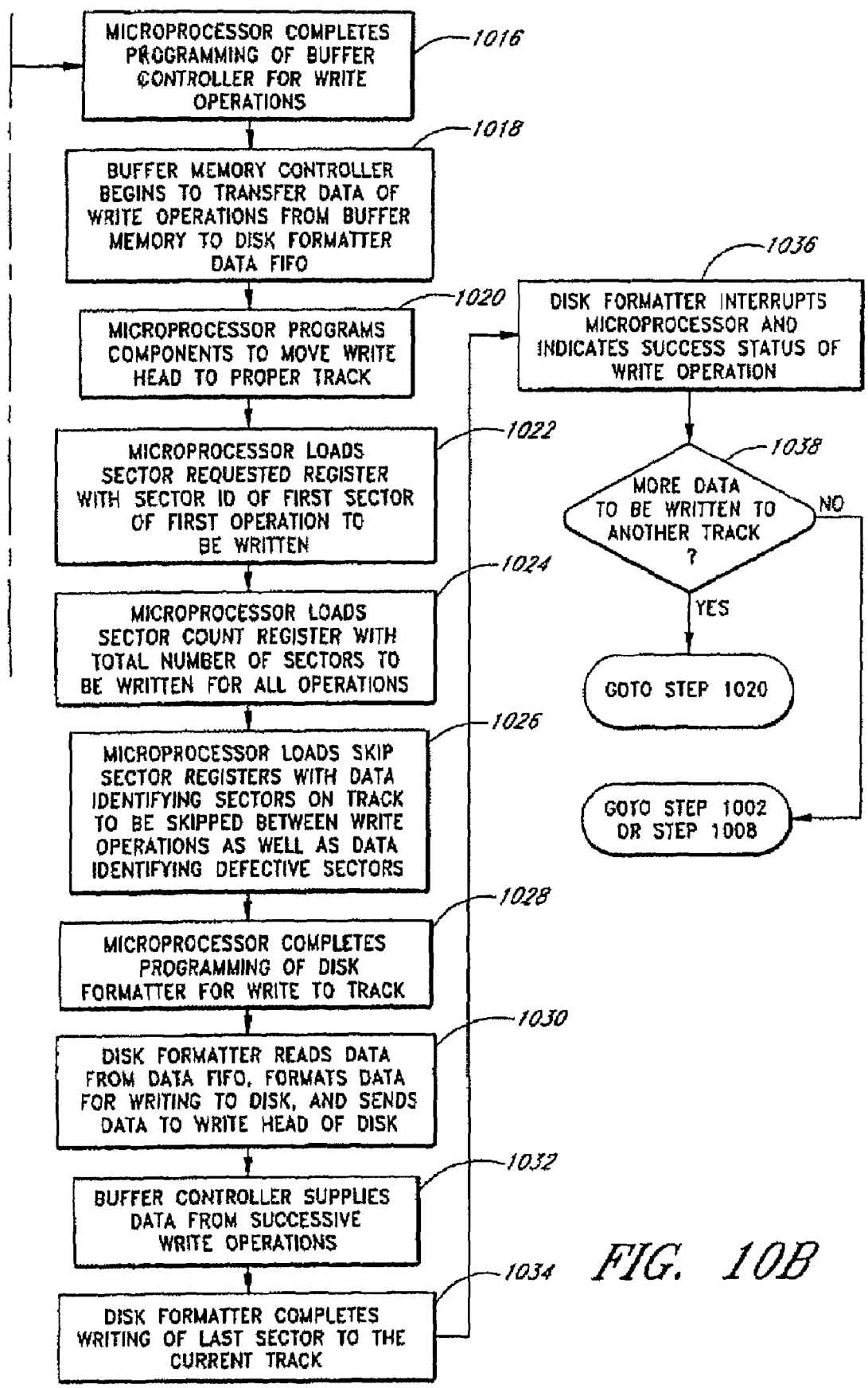

FIGS. 10A and 10B illustrate a preferred method 1000 performed by the hard disk controller 112 to complete multiple out of order operations using a single set of commands to the buffer memory controller 830 and the disk formatter 240. The microprocessor 204 is preferably programmed with the firmware 205 to perform the method 1000. The steps 1002, 1004, and 1006 are substantially the same as the steps 602, 604, and 606 of the method 600.

At a step 1008, the microprocessor 204 identifies two or more write operations that write data to the same track, where one or more of the operations arrive out of order with respect to the locations of the corresponding sectors on the track. At a step 1010, the microprocessor 204 orders the operations based upon the locations of their respective sectors on the track.

At a step 1012, the microprocessor 204 loads the address registers 852 with the beginning addresses in the buffer memory 206 of the data blocks of the write operations. In the preferred embodiment, the address registers 852 are written through a FIFO-like interface, which maintains the order in which the addresses are written. Accordingly, the addresses of the data blocks are loaded in the order, (determined by the microprocessor 204 in the step 1010) in which the corresponding write operations are to be written to the track. At a step 1014, the microprocessor loads the block count registers 862 with the corresponding number of data blocks for each write operation in the same manner.

At a step 1016, the microprocessor 204 completes programming the buffer memory controller 830. The programming preferably includes issuing a command to the buffer memory controller 830 instructing it to transfer data based upon the addresses and block counts loaded in the address registers 852 and the block count registers 862. The microprocessor 204 preferably also has the option of programming the buffer memory controller 830 to perform a regular data transfer in accordance with the method 600.

At a step 1018, the buffer memory controller 830 begins to transfer data of the write operations from the buffer memory 206 to the disk formatter FIFO 234. As the disk formatter 240 reads the data from the FIFO 234, the buffer memory controller 830 writes data to the FIFO 234 to keep the FIFO 234 from underflowing.

At a step 1020, the microprocessor 204 programs any additional components necessary to move the write head of the disk 114 to the proper track. The step 1020 may alternatively be performed between the steps 1012 and 1010.

At a step 1022, the microprocessor 204 loads the sector requested register 512 of the disk formatter 240 with the sector 1D of the first sector of the first write operation to be written to the track. At a step 1024, the microprocessor 204 loads the sector count register 514 with the total number of sectors to be written to the track for all of the identified operations.

At a step 1026, the microprocessor 204 loads the skip sector registers 516 with data identifying sectors on the track to be skipped between write operations. The registers are also loaded with the defective sectors on the track to be skipped during the writes. At a step 1028, the microprocessor 204 completes programming of the disk formatter 240 for the write to the track. This step typically includes loading a command into a command register of the disk formatter 240.

At a step 1030, the disk formatter 240 begins execution of the command loaded into its command register by the microprocessor 204. The disk formatter 240 reads data from the disk formatter data FIFO 234, formats the data for writing to the disk 114, and sends the data to the write head of the disk 114.

At a step 1032, the buffer memory controller 830 supplies data from the successive write operations according to the addresses and block counts loaded in the address registers 852 and the block count registers 862. The buffer memory controller 830 preferably performs the method 950 in this step.

At a step 1034, the disk formatter 240 completes the writing of the last sector to the current track. At a step 1034, the disk formatter 240 sends an interrupt to the controller microprocessor 204 and indicates the success status of the write to the track.

In the case that all of the write operations are completely on a single track, the method ends at this point and the hard disk controller 112 is prepared to perform additional write operations. Alternatively, the method 1000 may also be used when the first write operation and/or the last write operation to be executed span two or more tracks. For example, a short write operation to a track may arrive before a longer operation that ends on the same track. The latter operation can be executed first and followed by the first operation using a single buffer memory controller command. A single disk formatter command can be used to write the last portion of the latter command's data and all of the former command's data. In the case one or more write operations span two tracks, the method 1000 continues as described below.

At a next step 1036, the microprocessor determines whether there is more data to be written to another track in conjunction with the present set of write operations. If additional data remains to be written to another track, control passes back to the step 1020. From the step 1020, the microprocessor moves the write head to the next track and programs the disk formatter 240 to write more data to the next track.

At the step 1038, if the current set of write operations has completed since there remains no more data to be written to another track, the hard disk controller 112 is ready to handle the receipt or execution of another set of write operations. Accordingly, control passes to either the step 1002 or the step 1008, possibly depending upon whether another write operation has already been received.

D. Example Operation

Figure 11:
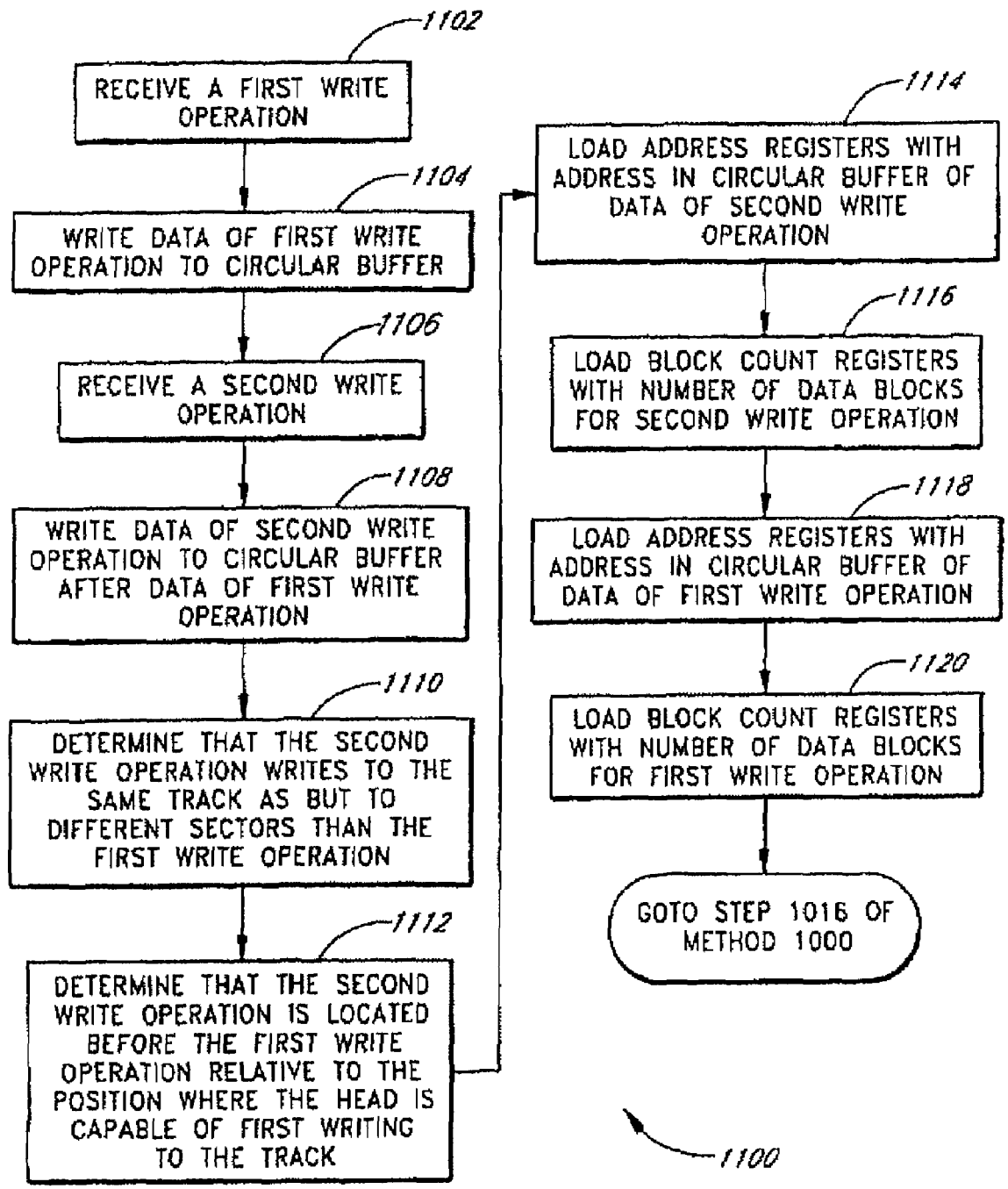
FIG. 11 illustrates a method of an example sequence of steps performed by the hard disk controller for two write operations that arrive out of order.

FIG. 11 illustrates a method 1100 of an example sequence of steps performed by the hard disk controller 112 for two write operations that arrive out of order. The method 1100 illustrates in more specific detail for the case of two write operations, the steps 1002 through 1014 of the method 1000.

At a step 1102, the ATA bus interface 220 receives a first write operation. At a step 1104, the buffer memory controller 230 writes the data of the first write operation to the circular data buffer 208. At a step 1106, the bus interface 220 receives a second write operation. At a step 1108, the buffer memory controller 230 writes the data of the second write operation to the circular data buffer 208 after the data of the first write operation. The data of the second write operation may but need not be contiguous with the data of the first write operation in the buffer memory 206.

At a step 1110, the microprocessor 204 determines that the second write operation writes to the same track as the first write operation. The microprocessor 204 preferably also determines that there are no commonly written sectors between the two write operations to avoid creating stale data. If the two operations involve a common sector, then the operations should be written in the order in which they arrive.

At a step 1112, the microprocessor 204 determines that the second write operation is located before the first write operation on the track. The microprocessor preferably makes this determination by comparing the sector numbers of the first sector that each operation writes. The order of the operations is determined relative to the position where the write head is capable of first writing to the track. In some embodiments, the disk formatter 240 may be configured to be able to first write data to any sector on the track. If the head arrives at a track with 1024 sectors and stabilizes itself while the head is over the 511th sector, for example, these embodiments may be configured to be able to write data to the 512th sector during the current revolution of the disk. In this case, if the first write operation writes to sector 127 and the second operation writes to sector 575, the second write operation is located before the first write operation on the track. In other embodiments, the disk formatter 240 may be configured to wait for and detect the 0th sector on a track before writing any data. In these embodiments, even if the head stabilizes itself over the 511th sector of a track with 1024 sectors, the disk formatter must wait until the 0th sector passes below the head before any data is written. In this case, if the first write operation writes to sector 575 and the second write operation writes to sector 127, the second write operation is located before the first write operation on the track.

In one embodiment, the steps 1110 and 1112 can be combined by comparing the starting and ending sector numbers of each write operation. In this case, both operations must also write to the same track. In addition, supposing the disk formatter 240 must wait for the 0th sector to pass before writing data, the ending sector number of the second operation must be less than the starting sector number of the first operation. It will be apparent to one skilled in the art how to handle the case where the disk formatter 240 need not wait for the 0th sector to pass before beginning an operation.

At a step 1114, the microprocessor 204 loads one of the address registers 852 with the address of the data of the second write operation in the circular data buffer 208. At a step 1116, the microprocessor 204 loads one of the block count registers 862 with the number of data blocks in the second write operation. At a step 1118, the microprocessor 204 loads one of the address registers 852 with the address of the data of the first write operation in the circular data buffer 208. At a step 1120, the microprocessor 204 loads one of the block count registers 862 with the number of data blocks in the first write operation.

Once the buffer memory controller 830 has been loaded with the addresses and block counts of the two operations, the method 1100 continues at the step 1016 of the method 1000.

E. Extensions and Additional Embodiments

The method 1100 can be generalized by one skilled in the art into the firmware code 205 to handle several write operations. The generalized firmware 205 can be configured to program the buffer memory controller 830 to provide data of multiple write operations to the disk formatter 240 regardless of the order in which the operations are received.

The number of operations that can be handled through a single command to the buffer memory controller 830 may be limited by the number of registers in the address registers 852 and the block count registers 862. In the preferred embodiment, however, these sets of registers 852 and 862 can be written by the microprocessor 204 while the buffer memory controller 830 is executing a command. This functionality allows a potentially infinite number of out of order write operations to be handled with a single command to the buffer controller 830.

III. CONCLUSION

Although the invention has been described in terms of certain preferred embodiments, other embodiments that are apparent to those of ordinary skill in the art, including embodiments which do not provide all of the features and advantages set forth herein, are also within the scope of this invention. Accordingly, the scope of the invention is defined by the claims that follow. In the claims, a portion shall include greater than none and up to the whole of a thing. In the method claims, reference characters are used for convenience of description only, and do not indicate a particular order for performing the method.

What is claimed is:

1. A controller for a disk drive, the controller comprising:
   first memory that stores first write operations and second write operations that are received in a first order;
   a processor that arranges the first write operations and the second write operations in a second order based on respective track sectors associated with the first and the second write operations, the second order being different from the first order; and
   a memory controller that transfers write operation data corresponding to the first write operations and the second write operations to a disk formatter in the second order in response to a single command from the processor.

2. The controller of claim 1, wherein the first memory stores the write operation data.

3. The controller of claim 2, further comprising second memory that stores corresponding addresses identifying a location of the write operation data of each of the first write operations and the second write operations stored in the first memory.

4. The controller of claim 3, wherein the second memory includes at least first registers and second registers that store the corresponding addresses.

5. The controller of claim 4, wherein the processor arranges the first write operations and the second write operations by storing the corresponding addresses in the first registers and the second registers based on the second order.

6. The controller of claim 4, further comprising third memory that stores data indicating a corresponding amount of write operation data stored within the first memory for each of the first write operations and the second write operations.

7. The controller of claim 6, wherein the memory controller transfers the write operation data based in part on the corresponding amount of write operation data stored in the third memory.

8. The controller of claim 6, wherein at least one of the second memory and the third memory is a first in first out (FIFO) buffer.

9. The controller of claim 1, further comprising the disk formatter, wherein the disk formatter includes a data buffer that stores data transferred between the first memory and a disk.

10. A method for operating a controller of a disk drive, the method comprising:
    storing first write operations and second write operations in a first memory, the first write operations and second write operations having been previously received in a first order;
    using a processor to arrange the first write operations and the second write operations in a second order based on respective track sectors associated with the first write operations and the second write operations, the second order being different from the first order; and
    in response to a single command from the processor, transferring write operation data corresponding to the first write operations and the second write operations to a disk formatter in the second order.

11. The method of claim 10, further comprising storing the write operation data in the first memory.

12. The method of claim 11, further comprising storing corresponding addresses in a second memory, wherein the corresponding addresses identify a location of the write operation data of each of the first write operations and the second write operations stored in the first memory.

13. The method of claim 12, wherein the second memory includes at least first registers and second registers that store the corresponding addresses.

14. The method of claim 13, wherein using the processor to arrange the first write operations and the second write operations includes storing the corresponding addresses in the first registers and the second registers based on the second order.

15. The method of claim 13, further comprising storing, in a third memory, data that indicates a corresponding amount of write operation data stored within the first memory for each of the first write operations and the second write operations.

16. The method of claim 15, further comprising transferring the write operation data based in part on the corresponding amount of write operation data stored in the third memory.

17. The method of claim 15, wherein at least one of the second memory and the third memory is a first in first out (FIFO) buffer.

18. The method of claim 10, further comprising storing, in a data buffer located in the disk formatter, data that is transferred between the first memory and a disk.

* * * * *